United States Patent
Babel et al.

(10) Patent No.: US 6,361,876 B1
(45) Date of Patent: *Mar. 26, 2002

(54) DURABLE PROTECTED OPTICAL COATINGS

(75) Inventors: Henry W. Babel, Huntington Beach; Mark M. Hasegawa, Fountain Valley; Steven A. Daneman, Westminster, all of CA (US)

(73) Assignee: McDonnell Douglas Corporation, Huntington Beach, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/431,688

(22) Filed: Apr. 28, 1995

Related U.S. Application Data

(63) Continuation of application No. 07/927,002, filed on Aug. 10, 1992, now abandoned.

(51) Int. Cl.$^7$ ................................................. B32B 9/00
(52) U.S. Cl. .................................................... 428/539.5
(58) Field of Search ...................................... 428/539.5

(56) References Cited

U.S. PATENT DOCUMENTS

| | | | |
|---|---|---|---|
| 3,607,338 A | 9/1971 | Webb et al. | |
| 3,762,940 A | 10/1973 | Bechtold | |
| 3,871,902 A | 3/1975 | Leinkram et al. | |
| 4,008,348 A * | 2/1977 | Slemp ........................ | 428/35 |
| 4,039,347 A | 8/1977 | Fletcher et al. | |
| 4,054,710 A | 10/1977 | Botsolas | |
| 4,074,482 A * | 2/1978 | Klahr ......................... | 52/171 |
| 4,314,004 A | 2/1982 | Stoneberg | |
| 4,341,841 A | 7/1982 | Ohno et al. | |
| 4,381,333 A | 4/1983 | Stewart et al. | |
| 4,650,833 A | 3/1987 | Sakagami et al. | |
| 4,663,234 A * | 5/1987 | Bouton ....................... | 428/422 |
| 4,710,426 A * | 12/1987 | Stephens .................... | 428/336 |
| 4,720,405 A | 1/1988 | Carson et al. | |
| 4,751,114 A | 6/1988 | Homma et al. | |
| 4,824,728 A | 4/1989 | Parsons et al. | |
| 4,910,050 A * | 3/1990 | Oldham et al. ............. | 427/386 |
| 4,939,031 A | 7/1990 | Torre et al. | |
| 4,980,206 A * | 12/1990 | Torre et al. ............... | 427/385.5 |
| 5,030,394 A | 7/1991 | Sietses et al. | |
| 5,061,769 A * | 10/1991 | Aharoni ...................... | 526/245 |
| 5,064,574 A * | 11/1991 | Oldham et al. ............. | 252/518 |
| 5,118,579 A * | 6/1992 | Aharoni et al. ............ | 428/422 |
| 5,148,511 A * | 9/1992 | Savu et al. ................. | 385/145 |
| 5,178,955 A * | 1/1993 | Aharoni et al. ............ | 428/421 |
| 5,183,839 A * | 2/1993 | Aharoni ...................... | 524/113 |
| 5,234,761 A | 8/1993 | Barnes et al. | |
| 5,290,424 A * | 3/1994 | Mozelewski et al. ....... | 205/116 |
| 5,296,285 A * | 3/1994 | Babel et al. ................ | 428/213 |
| 5,399,418 A | 3/1995 | Hartmanns et al. | |
| 5,401,573 A | 3/1995 | Babel et al. | |

* cited by examiner

*Primary Examiner*—Kathryn Gorgos
*Assistant Examiner*—Thomas H Parsons
(74) *Attorney, Agent, or Firm*—Alston & Bird LLP

(57) ABSTRACT

A metal substrate such as bare or anodized aluminum or an aluminum alloy having an inorganic white paint thermal control coating on the substrate, the coating having low solar absorptance and high infrared emittance, such as a potassium silicate binder having zinc oxide particles distributed therein, and a fluoropolymer topcoat such as polytetrafluoroethylene on the inorganic white coating, the topcoat having substantially no significant effect on the optical properties of the thermal control coating and having substantial adhesion to such coating and improved resistance to darkening under ultraviolet exposure in the outer space environment.

19 Claims, No Drawings

DURABLE PROTECTED OPTICAL COATINGS

This appln is a cont of Ser. No. 07/972,002 filed Aug. 10, 1992, abn.

BACKGROUND OF THE INVENTION

1. Field of the Invention

This invention relates to the protection of sensitive thermal control coating surfaces, and is specifically directed to the application of an improved protective coating over a thermal control coating subjected to a space environment.

2. Description of the Related Art

Temperature control of spacecraft and space structures is based on heat transfer to and from spacecraft through thermal radiators and solar panels since there is no atmosphere to conduct heat. The amount of heat transferred is determined by the surface optical properties of reflectance or solar absorptance and infrared emittance. For surfaces such as the radiators, it is important to absorb as little solar radiation as possible while radiating or emitting as much heat as possible. By selecting structural materials and/or coatings with specific optical properties, the designer can control the spacecraft's temperature.

Several factors can degrade or alter the optical properties of a thermal control coating. These factors include atomic oxygen, ultraviolet radiation and contamination from other spacecraft components and from nearby rocket engine firings. Experience indicates that contamination deposition can significantly decrease the reflectance. A decrease in the reflectance increases the amount of heat absorbed by the surface. This is particularly detrimental to radiators, since their function is to reject heat from the spacecraft.

Contamination due to outgassing of the materials used in the construction of the spacecraft and redeposition on sensitive surfaces can also significantly reduce the reflectance of these surfaces. The largest amount of deposition usually occurs during the first few years of the spacecraft's life. After the first couple of years, the outgassing from most of these materials is reduced and poses minimal further contamination risk. Another major source of contamination is from "water dumps" or berthing of space vehicles that use bipropellant thruster motors. Although contamination from this source can be controlled to some degree by optimizing exit nozzle directions and the spacecraft approach and engine firings, a method of mitigating the contamination effects on thermal control coatings in close proximity to the thrusters is preferred.

Inorganic (ceramic) white paint thermal control coatings are easily damaged, contaminated or the aluminum substrate corroded during ground handling and storage. This degrades the surface optical properties of the inorganic white paint coating, which can only be restored by extensive baking operations to remove contaminants or removal and reapplication of the coating. Cleaning and repairing coatings on earth is generally expensive and can result in schedule delays. On orbit, the coating is easily contaminated by bipropellant plumes and other orbital debris due to the high porosity of the ceramic coating.

The optical properties of silver-backed FEP (fluorinated ethylene-propylene), marketed as silverbacked Teflon, can degrade in the presence of atomic oxygen (AO) and particle radiation. For long-duration spacecraft, silver-backed Teflon will slowly be eroded away in low earth orbit by AO. The exact amount depends upon the orientation of the surface to the flight (ram) direction. At a 250 mile (400 km) altitude, Teflon normal to the ram direction will erode unacceptably.

Silver-backed quartz tiles have been shown to be very stable in most space environments. The application technique for the silver-backed quartz tiles is difficult and labor intensive. Tiles are small (generally less than 2"×2"), expensive and must be manually bonded into place, which increases production and schedule costs. Geometric complexities have made automated application of the tiles impractical. Tiles are also very brittle and tend to be damaged by impacts experienced during ground handling. For large radiative surfaces, silver-backed quartz tiles are impractical for use.

Current anodized aluminum does not possess the optical properties of the previously described coatings. Although anodic coatings are durable and corrosion-resistant, they are not optically stable in ultraviolet (UV) and particle radiation.

In U.S. application Ser. No. 887,851, filed May 26, 1992 (now U.S. Pat. No. 5,296,285), titled High Emittance Low Absorptance Coatings, by H. W. Babel et al and assigned to the same assignee as the present application, there are disclosed improved thermal control coatings in the form of an inorganic topcoat of a white paint on an anodized aluminum surface to achieve a low absorptance with controlled emissivity.

In U.S. application Ser. No. 895,667, filed Jun. 9, 1992 (now abandoned),titled Protected Optical Coatings, by H. W. Babel et al, and assigned to the same assignee as the present application, there is disclosed the application of an organic topcoat such as a polyurethane resin on an inorganic white paint thermal control coating on a metal, e.g. aluminum, substrate, such organic topcoat serving as a protective coat to maintain surface optical properties of the thermal control coating during service in an outer space environment, and provide corrosion protection of the substrate.

However, although such protective organic coatings can be easily applied, usually at ambient temperatures, the intense U.V. radiation encountered in space causes such protective coatings to darken to various degrees. It has proven very difficult to obtain an organic coating that is easily applied and is also sufficiently UV resistant.

Accordingly, one object of the invention is to provide improved protection of the optical properties of thermal control coatings from contamination during exposure and service in the space environment.

Another object is the provision of a protective coating over a thermal control coating, particularly those with porous surfaces, on a substrate, which is highly resistant to darkening from ultraviolet radiation.

Another object is the provision of a protective coating over a thermal control coating, particularly those with porous surfaces, on a substrate, which protective coating is a slowly eroded coating providing a steady contamination removal as the coating is eroded until the major sources of contamination such as material outgassing and redeposition from other materials on the spacecraft are reduced.

Still another object is to provide a protective coating of the above type which is strongly adherent to the thermal control coating in space and does not significantly affect the optical properties of the thermal control coating.

A still further object is the provision of a protective coating over the thermal control coating which protects the latter coating during cleaning and handling, and also protects the coated substrate from corrosion.

Yet another object is to provide a protective coating of the above type over an inorganic white paint thermal control coating on a bare or anodized aluminum or aluminum alloy substrate.

A still further object is the provision of a protective coating over the thermal control coating which provides additional handling ruggedness compared to thermal control coatings without a topcoat.

Still another object is to provide procedure for application of such protective coating over a thermal control coating on a metal substrate, such as a bare or anodized aluminum or an alloy thereof.

Further objects and advantages of the invention will appear hereinafter.

SUMMARY OF THE INVENTION

The above objects and advantages are achieved according to the invention by the application of an organic coating in the form of a fluoropolymer to a sensitive optical thermal control surface.

Thus, there is provided according to the invention a substrate formed of a metal such as aluminum or an alloy thereof, or anodized aluminum or anodized aluminum alloy, having an inorganic white paint thermal control coating, such coating having low solar absorptance and high infrared emittance, and a protective fluoropolymer topcoat on the inorganic white coating, such topcoat having substantially no significant effect on the optical properties of the thermal control coating and having substantial adhesion to the inorganic white coating and being more resistant to darkening under ultraviolet exposure in the outer space environment, than the organic topcoat of above application Ser. No. 895,667.

Fluoropolymers are eroded by atomic oxygen at a much slower rate than the organic topcoat materials of above Ser. No. 895,667, thereby providing a longer duration in which contaminants are removed because of the slow coating erosion rate. The fluoropolymer coating slightly but measurably, improves (reduces) the absorptance characteristics by reducing solar absorptance and increasing solar emittance when the fluoropolymer coating is applied to an inorganic white thermal control coating. Materials including contaminants do not stick well to fluoropolymers or fluorocarbons, as well known in their application to frying pans, as compared to polyurethanes and acrylics. The fluoropolymers also have much higher temperature capability that is, they withstand higher temperatures better than acrylics and polyurethanes, and much better properties than acrylics at low temperatures.

The protective fluoropolymer coating hereof is durable enough to withstand cleaning easily on earth to remove contamination incurred during manufacturing, and protect the thermal control coating during handling. In low earth orbit, however, the organic topcoat will erode sufficiently when facing the spacecraft velocity vector (ram direction) from 0° (ram facing) to 90° (parallel to velocity direction). The organic sacrificial coating slowly erodes by atomic oxygen when facing the ram direction, removing contamination deposits until the coating is completely eroded away, and thereby minimizing optical property degradation. One application of the invention concept permits ram facing radiators and solar panels to be sized smaller because the optical properties are thus rendered more stable.

The benefits of the fluoropolymer topcoat for improved cleanability, handling durability and corrosion protection of the substrate are relevant for higher orbit applications and other space missions even though the topcoat will not erode in these orbits or applications.

DETAILED DESCRIPTION OF THE INVENTION AND PREFERRED EMBODIMENTS

The present invention is directed to the application of a fluoropolymer sacrificial coating to a sensitive optical thermal control surface such as porous coatings, e.g. inorganic white paints, on a bare or anodized aluminum or a bare or anodized aluminum alloy substrate, to protect the optical properties of such thermal control surface coatings.

The substrates which are coated with the optically sensitive thermal control coating are particularly bare aluminum and its alloys. These include, for example, the 5,000 series of aluminum alloys containing Mg as a primary alloying element, the 7,000 series containing Zn as primary alloying element, the 2,000 series containing Cu as a primary alloying element and the 6,000 series containing Si and Mg as primary alloying elements. The invention is also applicable to other aluminum alloys, and including clad aluminum alloys. 6061-T6 aluminum is a particularly useful aluminum alloy. While aluminum or its alloys are preferred substrates for minimum weight, other substrates to which the thermal control coating can be applied include, for example, stainless steel and titanium.

The substrates which are coated with the optically sensitive thermal control coating also can be aluminum and its alloys, as exemplified above, having an anodized surfaces The anodic coating on the aluminum or aluminum alloy substrate can be applied by any conventional anodizing procedure, for example in an aqueous sulfuric acid electrolyte employing direct current. A direct current step-wise current density anodizing procedure in an aqueous sulfuric acid solution at elevated temperature is described in U.S. application Ser. No. 876,768, filed May 1, 1992 (now U.S. Pat. No. 5,217,600), by H. G. Le, et al. and assigned to the same assignee as the present application, and is incorporated herein by reference.

In carrying out the anodizing procedure, the aluminum or aluminum alloy substrate is generally first cleaned, as in an alkaline solution prior to anodizing, and after anodizing the anodic coating is generally sealed as by treatment in demineralized water at elevated temperature.

The thickness of this anodic coating can range from about 0.5 to about 1 mil.

The thermal control coating applied to the substrate, e.g. bare or anodized aluminum or an alloy thereof, is in the nature of a porous coating and which can be an inorganic white paint. Various inorganic white thermal control paints can be applied. An example of an available inorganic white paint is the paint marketed as Z-93 by Illinois Institute of Technology Research Institute (IITRI), understood to be comprised of zinc oxide particles and potassium silicate binder. Another inorganic white paint which can be employed is the paint YB-71 also marketed by IITRI, understood to be comprised of zinc orthotitanate particles and potassium silicate binder. The amount of such particles distributed in the binder of the above white paint can range from about 50 to about 90%, preferably from about 75 to about 85%, e.g. about 80%, by weight of the total mixture of particles and binder of the paint. Other white inorganic paints suitable as a thermal control coating can be employed, including, for example, various types of silicate based paints.

The inorganic white paint is applied to a bare or anodized aluminum or to a bare or anodized aluminum alloy substrate, by spraying. The spray mixture is prepared, for example, by adding the particles, such as zinc oxide particles, to a commercially available aqueous solution of potassium silicate. If desired, additional water can be added to the mixture to prepare a readily sprayable white paint formulation. If desired, such paint formulation can also be applied to the bare or anodized aluminum or aluminum alloy substrate by brushing or dipping.

Following application of the inorganic white paint topcoat on the aluminum or anodized aluminum substrate, the paint is dried or cured, e.g. at ambient temperature in a controlled humidity environment. In the case where Z-93 white topcoat has been applied, curing thereof can be achieved in a 40 to 70% humidity environment at a temperature between 60 and 80° F. for 7 days.

The aluminum or anodized aluminum substrate coated with an inorganic white paint according to the invention has a low solar absorptance ranging from about 0.15 to about 0.20, and a high infrared emittance ranging from about 0.90 to about 0.92.

Where the inorganic white paint is applied to a bare or anodized aluminum or aluminum alloy substrate, the thickness of such coating in cured form can be up to about 10 mils, e.g. about 1 to about 10 mils, in order to obtain suitable optical properties of solar absorptance and infrared emittance.

The topcoat that can be applied to thermal control coatings, such as the inorganic white coating on a metal substrate, e.g. a bare or anodized aluminum or aluminum alloy, to protect the optical properties of the thermal control coating, according to the present invention, is a fluoropolymer topcoat having substantially no significant effect on the optical properties of such thermal control coating, that is, with respect to solar absorptance and infrared emittance, has improved resistance to darkening under ultraviolet radiation, has substantial adhesion to such inorganic white coatings, and also provides corrosion protection for the substrate when the substrate is not anodized, that is in the case of bare aluminum or an alloy thereof. This topcoat may erode from atomic oxygen but is particularly resistant to ultraviolet exposure in the outer space environment. improved fluoropolymer topcoats applied over the thermal control coating or inorganic white paint according to the invention, is preferably a fluorocarbon polymer. A chlorinated fluorocarbon polymer can also be employed. Examples of the fluorocarbon polymers which can be employed include polytetrafluoroethylene, marketed as TEFLON by DuPont, polytetrafluoroethylene containing perfluoroalkoxy side chains, and marketed as "PFA" by DuPont, ethylene tetrafluoroethylene copolymer (ETFE), marketed as "Tefzel" by DuPont, polyvinylidene fluoride, marketed as "Kynar" by Pennwalt Corporation, and chlorotrifluoroethylene polymer, marketed as "KEL-F" by 3M Corporation. Additional examples of suitable fluorocarbon polymers which can be employed include fluorinated ethylene propylene polymer (FEP) marketed by DuPont.

The above fluoropolymer topcoats do not significantly affect the optical properties of the thermal control coating and do not degrade to unacceptable levels because of the environmental exposure in space. The fluoropolymer coating is particularly resistant to sensitiveness and to darkening by U.V. (ultraviolet) light in the outer space environment, since if the fluoropolymer film darkens, this would change the optical properties of the protected thermal control coating. The fluoropolymer coating should either reflect or transmit radiation in the wavelength from 250 to 2500 unm. Usually, the thin fluoropolymer coatings are clear or white to the naked eye. When applied to the thermal control coating, the fluoropolymers tend to produce a final product that is off-white in color to the naked eye.

Although the fluoropolymer topcoat must have sufficient bond integrity not to grossly delaminate, limited regions of unbond may not interfere with performance. An additional characteristic is that the fluoropolymer film should be resistant to shrinkage and flaking off during heating and cooling cycles in space, and must maintain integrity during thermal cycles in space. The fluoropolymer coating is also sufficiently durable to withstand cleaning processes on earth to remove contamination incurred during handling and manufacturing, and thus protect the porous thermal control coating during such procedures. Finally, the fluoropolymer coating slowly erodes in orbit of the spacecraft from the effects of atomic oxygen, cleaning away deposited contamination, while minimizing optical property degradation.

The fluoropolymer coating can be applied as a topcoat over the inorganic white thermal control coating by conventional means, such as by spraying, doctor blade application, rolling in with a roller, or immersing in a liquid resin bath, with or without pressure impregnation, using any of the above fluoropolymer materials. Some of such fluoropolymer materials require curing at suitable elevated temperatures ranging from about 400 to about 700° F. (204–372° C.) for the particular fluoropolymer material. As these processes tend to soften a heat-treated aluminum substrate an alternative process is plasma spraying of a fluoropolymer which does not require a post-application elevated temperature cure cycle. During such spraying, the aluminum substrate should be cooled to prevent softening of the aluminum.

The fluoropolymer sacrificial topcoat can be partially absorbed into the porous white inorganic paint coating, or can reside only on the inorganic coating surface, or a combination of both. Since the inorganic paint coating is of a porous nature, the organic topcoat is usually at least partially impregnated into the pores of the white inorganic paint coating. Thus, if for example, the fluoropolymer material is sprayed onto the inorganic porous white paint surface, it will initially soak into the porous paint surface. The fluoropolymer material impregnated into the pores of the white paint gives it some body. This may be sufficient to render the thermal control coating system operable and cleanable and also provide sufficient durability. However, usually additional fluoropolymer topcoat material is applied to provide additional fluoropolymer coating extending above the top surface of the inorganic thermal control paint coating.

In any event, it is desirable to build up a cleanable fluoropolymer coating to a sufficient thickness to protect the optical properties and physical integrity of the fragile white inorganic coating, while making the organic coating as thin as possible to achieve the benefits thereof. Thus, the fluoropolymer coating can have a thickness up to about 3 mils, e.g. about 0.1 to about 3 mils. It is understood that the term "coating" as applied to the fluoropolymer material applied over the thermal control white inorganic paint coating, refers to the fluoropolymer material impregnated into the pores of the white inorganic paint, as well as that portion of the fluoropolymer material extending above the surface of such inorganic paint, The fluoropolymer coating is useful for the maintenance of all spacecraft thermal control surfaces. For surfaces facing the ram direction in low earth orbit, the optical properties of the thermal control coating would be maintained close to their original values because of the slow erosion of the fluoropolymer coating and the removal of contaminants. The fluoropolymer coating is also useful for protecting surfaces that could be easily damaged by an astronaut contacting the surface during extravehicular activity.

This fluoropolymer coating can be used on earth for protecting sensitive surfaces during manufacturing from physical damage due to handling while providing a surface that is easily cleaned without damaging the optical properties. This concept applies to any spacecraft and is not restricted to spacecraft designed for low earth orbits. The fluoropolymer coating also provides corrosion protection for an unanodized aluminum substrate.

The following are examples of practice of the invention:

EXAMPLE 1

Samples of 6061-T6 aluminum were sprayed with Z-93 (zinc oxide in a potassium silicate binder). The aluminum substrate was first cleaned and abraded using a 10% Alconox water solution and a Scotch brite pad to provide a water break free surface. Alconox is a phosphate based dry detergent marketed by Alconox, Inc. of New York, N.Y. The panel was then rinsed with a technical grade acetone and inspected for any surface residue. The panels were then dried in air and then rub primed with a small amount of previously prepared Z-93 solution on a soft cloth. The surface was rub primed until a grayish coloring appeared over the surface of the panel.

The panels were allowed to cure for a minimum of 16 hours in a room having a temperature of about 75° F. and a relative humidity of 65%. The panels were mounted horizontally in a fume hood and lightly sprayed with deionized water. Once the water coated surface had regained its diffuse finish, a coating of Z-93 was applied.

The spray solution of the white paint was prepared from the proprietary Z-93 white paint material containing separately packages of zinc oxide particles and 35% aqueous potassium silicate solution, by mixing the zinc oxide particles with the 35% aqueous potassium silicate solution. Additional water was added to the mixture so that the final formulation was comprised of 44% zinc oxide, 10% potassium silicate and 46% water, by weight.

The resulting mixture was sprayed from a low pressure spray gun onto the aluminum alloy substrate, using a filtered air line.

The first two layers of Z-93 were applied without drying between layers until a 4 to 6 mil wet thickness was achieved. The panels were then dried until the surface finish changed from a specular finish to a diffuse finish. After this drying, another two passes as described above were applied to the panels. The final thicknesses of wet Z-93 coating were between 8 to 12 mils.

After the application of the Z-93 coating to the substrates, the coated substrates were allowed to cure for 7 days in a room having a temperature of about 75° F. and a relative humidity of 65%. A cured coating thickness of 5 to 7 mils was obtained. The optical properties of the Z-93 coated surface were $\alpha=0.15$ and $\epsilon=0.91$.

A dispersion of polytetrafluoroethylene (PTFE) from DuPont was provided. The Z-93 coated panels were placed horizontally on a flat surface and sprayed with the polytetrafluoroethylene. Three coats of polytetrafluoroethylene were applied one immediately after the other to the Z-93 coating on the panels. The resulting coating was then cured for 10 minutes at 660° F. (349° C.) to produce a smooth surface. The thickness of the cured polytetrafluoroethylene coating was about 1 mil. The optical properties of the final coating system were $\alpha=0.13$ and $\epsilon=0.90$. The coating surface was smooth with an off-white color.

EXAMPLE 2

The same procedure as in Example 1 was followed except a polytetrafluoroethylene containing perfluoroalkoxy side chains (PFA) dispersion was applied in place of the polytetrafluoroethylene dispersion. It was cured for 10 minutes at 550° F. (288° C.).

The optical properties of the coating system were $\alpha=0.19$ and $\epsilon=0.90$. The coating surface was smooth with an off-white color.

EXAMPLE 3

The same procedure as in Example 1 was followed except a Tefzel (ethylene-tetrafluoroethylene copolymer) dispersion was applied. It was cured for 10 minutes at 520° F. (271° C.).

The optical properties of the coating system were $\alpha=0.18$ and $\epsilon=0.90$. The coating surface was smooth with an off-white color.

EXAMPLE 4

The same procedure as in Example 1 was followed except a Kynar (polyvinylidene fluoride) dispersion was applied. It was cured for 10 minutes at 450° F. (232° C.).

The optical properties of the coating system were $\alpha=0.21$ and $\epsilon=0.90$. The coating surface was smooth with an off-white color.

EXAMPLE 5

Using any of the protective fluoropolymers in Examples 1–4, the substrate can be changed to stainless steel or titanium.

EXAMPLE 6

Samples of 6061-T6 aluminum alloy sheet were alkaline cleaned by immersion in a solution of Turco 4090 for 15 minutes at 200° F. and rinsed with tap water. The samples were then deoxidized in a mixture of nitric, chromic, and hydrofluoric acids for 1.5 minutes, and rinsed in tap water. The anodized coating was sealed with deionized hot water for 10 minutes at 200° F.

The aluminum samples were then anodized with direct current electrolysis in a sulfuric acid bath having a concentration of 15%. The anodizing voltage was maintained constant at 15 volts. This resulted in an approximate current density of 12 to 13 amperes per square foot (A/ft$^2$). The bath temperature was 75° F.

The panels were mounted horizontally in a fume hood and lightly sprayed with deionized water. Once the water coated surface had regained its diffuse finish, a coating of Z-93 was applied.

The spray solution of the white paint was prepared from the proprietary Z-93 white paint material containing separate packages of zinc oxide particles and 35% aqueous potassium silicate solution, by mixing the zinc oxide particles with the 35% aqueous potassium silicate solution. Additional water was added to the mixture so that the final formulation was comprised of 44% zinc oxide, 10% potassium silicate and 46% water, by weight.

The resulting mixture was sprayed from a low pressure spray gun at a pressure of 25 psi onto the anodic coating produced on the aluminum alloy samples, using a filtered air line. A two pass coating of the Z-93 white paint was used to deposit between 2 to 5 mils of wet Z-93 onto the anodized aluminum samples. This allowed for a dry thickness of 1 to 3 mils of cured Z-93.

After the application of the Z-93 coating to the anodized aluminum substrates, the coated substrates were allowed to cure for 7 days in a room having a temperature of about 75° F. and a relative humidity of 65%. Z-93 coating was applied at least 0.002 inch thick. The optical properties of the Z-93 coated surface were α=0.15 and ε=0.90. A dispersion of polytetrafluoroethylene (PTFE) from DuPont was provided. The Z-93 coated panels were placed horizontally on a flat surface and sprayed with the polytetrafluoroethylene. Three coats of polytetrafluoroethylene were applied one immediately after the other to the Z-93 coating on the panels. The resulting coating was then cured for 10 minutes at 660° F. (349° C.) to produce a smooth surface. The thickness of the cured polytetrafluoroethylene coating was about 1 mil. The optical properties of the final coating system were α=0.13 and ε=0.90. The coating surface was smooth with an off-white color.

EXAMPLE 7

The same procedure as in Example 6 was followed except a polytetrafluoroethylene containing perfluoroalkoxy side chains (PFA) dispersion was applied in place of the polytetrafluoroethylene dispersion. It was cured for 10 minutes at 550° F. (288° C.).

The optical properties of the coating system were α=0.19 and ε=0.90. The coating surface was smooth with an off-white color.

EXAMPLE 8

The same procedure as in Example 6 was followed except a Tefzel (ethylene-tetrafluoroethylene copolymer) dispersion was applied. It was cured for 10 minutes at 520° F. (271° C.).

The optical properties of the coating system were α<=0.18 and ε=0.90. The coating surface was smooth with an off-white color.

EXAMPLE 9

The same procedure as in Example 6 was followed except a Kynar (polyvinylidene fluoride) dispersion was applied. It was cured for 10 minutes at 450° F. (232° C.).

The optical properties of the coating system were α=0.21 and ε=0.90. The coating surface was smooth with an off-white color.

From the foregoing it is seen that the invention provides an efficient fluoropolymer coat over a thermal control coating to maintain surface optical properties thereof during space service for the duration the fluoropolymer overcoat exists on the surface.

Since various modifications of the invention will occur to those skilled in the art, the invention is not to be taken as limited except by the scope of the appended claims.

What is claimed is:

1. An article containing a thermal control coating having protected optical properties for use in low earth orbit outer space environments, consisting of:
   a metal substrate;
   optionally, an anodic coating;
   a porous inorganic ceramic white thermal control paint on a surface of said substrate; and
   a protective fluoropolymer topcoat applied to said porous inorganic ceramic white thermal control paint and at least partially impregnated into the pores of the thermal control paint.

2. The article of claim 1, wherein said fluoropolymer is a fluorocarbon polymer.

3. The article of claim 1, wherein said fluoropolymer is a chlorinated fluorocarbon polymer.

4. The article of claim 1, wherein said fluoropolymer is selected from the group consisting of polytetrafluoroethylene, polytetrafluoroethylene containing perfluoroalkoxy side chains, ethylene tetrafluoroethylene copolymer, polyvinylidene fluoride, fluorinated ethylene propylene polymer, and chlorotrifluoroethylene polymer.

5. The article of claim 1, wherein said topcoat is applied with sufficient thickness to protect the optical properties of the thermal control coating from being degraded by contaminants in a low earth orbit outer space environment.

6. The article of claim 1, wherein said fluoropolymer topcoat has a thickness of up to about 3 mils.

7. The article of claim 1, wherein said fluoropolymer topcoat is resistant to shrinkage and flaking.

8. The article of claim 1, wherein said fluoropolymer is resistant to darkening in a high ultraviolet energy environment.

9. The article of claim 1, wherein said topcoat has no significant effect on the optical properties of the thermal control paint.

10. The article of claim 1, wherein said topcoat is slowly eroded in a low earth orbit outer space environment thereby reducing contamination of said substrate, said topcoat is capable of withstanding the thermal cycles of an outer space environment, and said topcoat is sufficiently durable to withstand cleaning without destroying the topcoat in an earth non-space environment.

11. The article of claim 1, wherein said metal substrate is non-ferrous.

12. The article of claim 1, wherein said substrate is selected from the group consisting of aluminum, aluminum alloys, anodized aluminum, and anodized aluminum alloys.

13. The article of claim 11, wherein said substrate is treated to provide an anodic coating.

14. The article of claim 13, wherein said anodic coating does not provide any substantial amount of reflectance, and said thermal control paint is selected to provide desired reflectance and high infrared emittance.

15. The article of claim 1, wherein said thermal control paint is selected from the group consisting of a potassium silicate binder having zinc oxide particles distributed therein, and a potassium silicate binder having zinc orthotitanate particles distributed therein.

16. The article of claim 1, wherein said thermal control coating has a low solar absorptance and a high infrared emittance.

17. The article of claim 1, wherein said thermal control paint has a thickness of up to about 10 mils.

18. An article containing a thermal control coating having protected optical properties for use in low earth orbit outer space environments, consisting of:
   a metal substrate;
   a porous inorganic ceramic white thermal control paint on a surface of said substrate; and
   a protective topcoat applied to said porous inorganic ceramic white thermal control paint and at least partially impregnated into the pores of the thermal control paint, said topcoat consisting essentially of a fluoropolymer.

19. An article containing a thermal control coating having protected optical properties for use in low earth orbit outer space environments, consisting of:
 a non-ferrous metal substrate;
 a porous inorganic ceramic white thermal control paint on a surface of said substrate, said thermal control paint having a low solar absorptance and a high infrared emittance; and
 a protective fluoropolymer topcoat applied to said porous inorganic ceramic white thermal control paint and at least partially impregnated into the pores of the thermal control paint, wherein said fluoropolymer has no significant effect on the optical properties of the thermal control paint, is resistant to darkening in a high ultraviolet energy environment, is slowly eroded in a low earth orbit outer space environment thereby reducing contamination of said substrate, is capable of withstanding the thermal cycles of an outer space environment, and is sufficiently durable to withstand cleaning without destroying the topcoat in an earth non-space environment.

* * * * *

UNITED STATES PATENT AND TRADEMARK OFFICE
CERTIFICATE OF CORRECTION

PATENT NO. : 6,361,876 B1
DATED : March 26, 2002
INVENTOR(S) : Henry W. Babel et al.

It is certified that error appears in the above-identified patent and that said Letters Patent is hereby corrected as shown below:

<u>Title page,</u>
After Item [*] Notice: change "Subject to any disclaimer, the term of this patent is extended or adjusted under 35 U.S.C. 154(b) by 0 days." to -- Subject to any disclaimer, the term of this patent is extended or adjusted under 35 U.S.C. 154(b) by 53 days. --

Signed and Sealed this

Seventeenth Day of December, 2002

JAMES E. ROGAN
*Director of the United States Patent and Trademark Office*